US012737666B2

(12) United States Patent
Oura

(10) Patent No.: US 12,737,666 B2
(45) Date of Patent: Sep. 15, 2026

(54) LEARNING APPARATUS THAT ADJUSTS TRAINING SET USED FOR MACHINE LEARNING, ELECTRONIC APPARATUS, LEARNING METHOD, CONTROL METHOD FOR ELECTRONIC APPARATUS, AND STORAGE MEDIUM

(71) Applicant: CANON KABUSHIKI KAISHA, Tokyo (JP)

(72) Inventor: Hayato Oura, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 1358 days.

(21) Appl. No.: 17/179,989

(22) Filed: Feb. 19, 2021

(65) Prior Publication Data

US 2021/0264314 A1 Aug. 26, 2021

(30) Foreign Application Priority Data

Feb. 25, 2020 (JP) ................................ 2020-029497

(51) Int. Cl.
*G06N 20/00* (2019.01)
*G06N 5/04* (2023.01)

(52) U.S. Cl.
CPC ............... *G06N 20/00* (2019.01); *G06N 5/04* (2013.01)

(58) Field of Classification Search
CPC .......... G06N 20/00; G06N 3/045; G06N 3/08; G06N 7/01; G06N 3/084; G06N 20/20; G06N 3/088; G06N 3/0464; G06N 5/01; G06N 3/0455; G06N 5/04; G06N 20/10; G06N 3/02; G06N 3/047; G06N 3/0985; G06N 3/042; G06N 3/048; G06N 3/0895; G06N 3/04; G06N 3/044; G06N 5/022; G06N 5/045; G06N 3/09; G06N 3/096; G06N 3/0475; G06N 3/092; G06N 3/0442; G06N 3/049; G06N 3/098; G06N 5/02; G06N 3/006; G06N 3/094; G06N 5/025; G06N 3/0495; G06N 3/0499; G06N 3/063;
(Continued)

(56) References Cited

U.S. PATENT DOCUMENTS

2016/0086094 A1* 3/2016 Tsubouchi ............. G06N 5/025 706/52
2017/0132515 A1* 5/2017 Yokoi .................... G06N 3/045
(Continued)

FOREIGN PATENT DOCUMENTS

CN 110706713 A * 1/2020 ........... G06F 18/214
JP 2014153906 A 8/2014

OTHER PUBLICATIONS

"Data-Driven Soft Decoding of Compressed Images in Dual Transform-Pixel Domain" Liu et al (Year: 2016).*
CN110706713A English translation (Year: 2020).*

*Primary Examiner* — Luis A Sitiriche
(74) *Attorney, Agent, or Firm* — ROSSI, KIMMS & McDOWELL LLP

(57) ABSTRACT

A learning apparatus includes an adjustment unit configured to, for a training set including a plurality of pieces of training data, adjust the number of pieces of training data included in the training set such that feature values of the plurality of pieces of training data have a predetermined distribution, and a training unit configured to perform machine learning using the training set to generate a learned model.

14 Claims, 10 Drawing Sheets

(58) Field of Classification Search
CPC ........ G06N 3/065; G06N 3/126; G06N 5/046; G06N 5/048; G06N 7/023; G06N 99/00; G06N 10/20; G06N 10/40; G06N 10/60; G06N 3/008; G06N 3/082; G06N 3/086; G06N 3/10; G06N 5/047; G06N 7/00
See application file for complete search history.

(56) References Cited

U.S. PATENT DOCUMENTS

| | | | | |
|---|---|---|---|---|
| 2017/0199900 | A1* | 7/2017 | Lee | G06F 16/29 |
| 2019/0370662 | A1* | 12/2019 | Song | G06N 3/088 |
| 2019/0392248 | A1* | 12/2019 | Zhang | G06V 10/761 |
| 2020/0401931 | A1* | 12/2020 | Duan | G06F 18/23 |
| 2021/0345945 | A1* | 11/2021 | Kimmel | G06T 17/20 |

* cited by examiner

FIG. 4

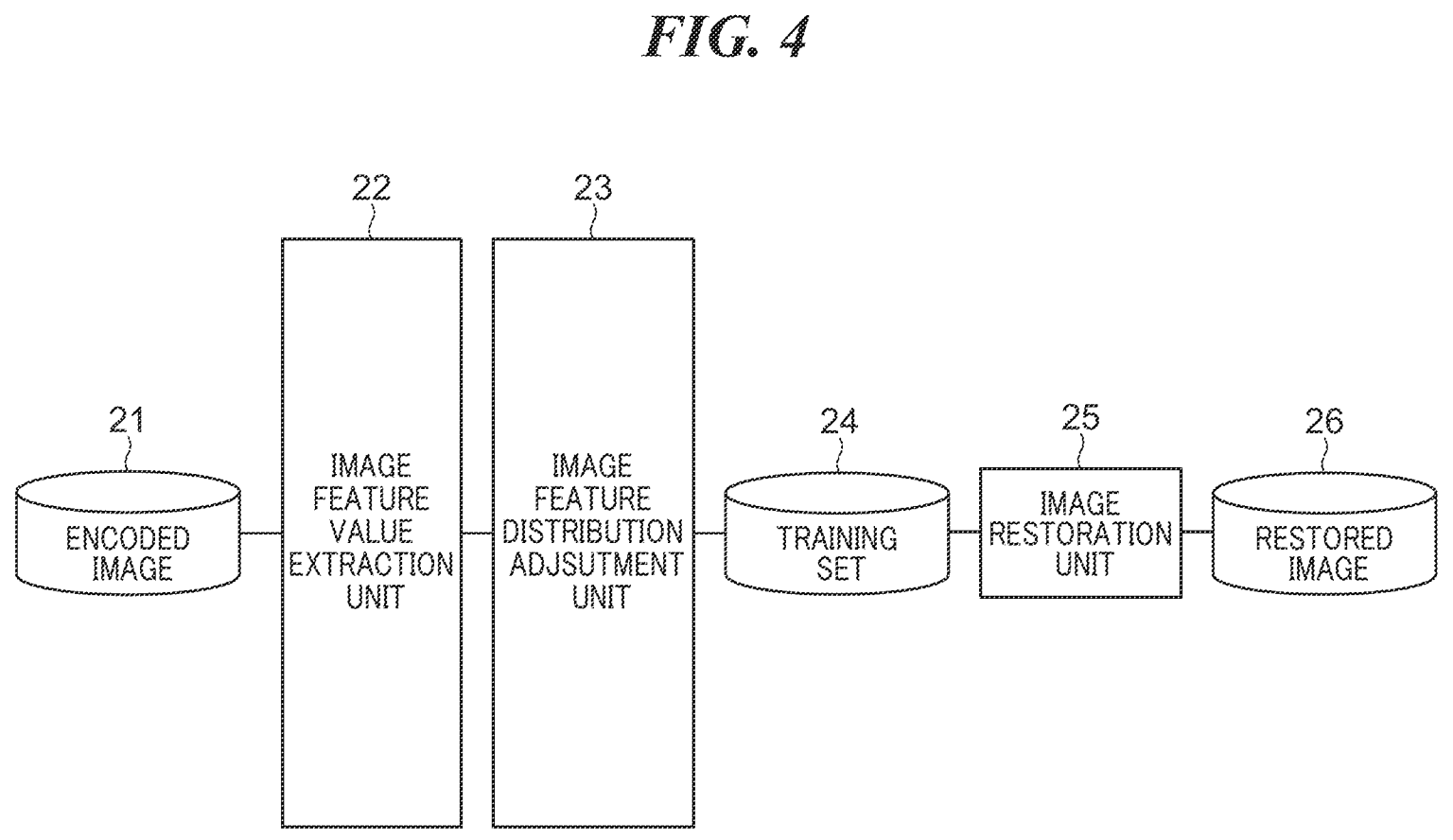

21 ENCODED IMAGE

22 IMAGE FEATURE VALUE EXTRACTION UNIT

23 IMAGE FEATURE DISTRIBUTION ADJSUTMENT UNIT

24 TRAINING SET

25 IMAGE RESTORATION UNIT

26 RESTORED IMAGE

LEARNING APPARATUS THAT ADJUSTS TRAINING SET USED FOR MACHINE LEARNING, ELECTRONIC APPARATUS, LEARNING METHOD, CONTROL METHOD FOR ELECTRONIC APPARATUS, AND STORAGE MEDIUM

BACKGROUND OF THE INVENTION

Field of the Invention

The present invention relates to a learning apparatus that adjusts a training set used for machine learning, an electronic apparatus, a learning method, a control method for the electronic apparatus, and a storage medium.

Description of the Related Art

Machine learning using a neural network or the like has lately been used for image processing. For example, when image data is input to a neural network that has been trained through machine learning, a result of inference about image processing is obtained. Machine learning is performed using a large amount of training data. On this occasion, there may be cases where inference accuracy is low depending on training data used in machine learning. As a related art, there is a technology proposed in Japanese Laid-Open Patent Publication (Kokai) No. 2014-153906. According to the technology described in Japanese Laid-Open Patent Publication (Kokai) No. 2014-153906, when results of determination as to types of possible defects do not match, new supervised data is added in accordance with inputs from an inspector, and re-learning is performed to set new criteria.

According to the technology described in Japanese Laid-Open Patent Publication (Kokai) No. 2014-153906, in a case where results of determination as to types of possible defects do not match after initial training of a learned model is performed, supervised data is added to perform re-learning. Thus, although re-leaming is performed, the performance of the learned model is greatly influenced by the initial training which is predominant. For this reason, even when re-learning is performed using newly-added supervised data as described in Japanese Laid-Open Patent Publication (Kokai) No. 2014-153906, the inference accuracy by a learned model obtained as a result of re-learning may not be satisfactorily improved when supervised data used in the initial learning is not right.

SUMMARY OF THE INVENTION

It is an object of the present invention in one aspect to improve inference accuracy of a learned model obtained by machine learning.

Accordingly, the present invention provides a learning apparatus includes an adjustment unit configured to, for a training set comprising a plurality of pieces of training data, adjust the number of pieces of training data included in the training set such that feature values of the plurality of pieces of training data have a predetermined distribution, and a training unit configured to perform machine learning using the training set to generate a learned model.

Further features of the present invention will become apparent from the following description of exemplary embodiments (with reference to the attached drawings).

BRIEF DESCRIPTION OF THE DRAWINGS

FIG. 4 is a diagram showing a machine learning process according to a first embodiment.

DESCRIPTION OF THE EMBODIMENTS

Figure 1:
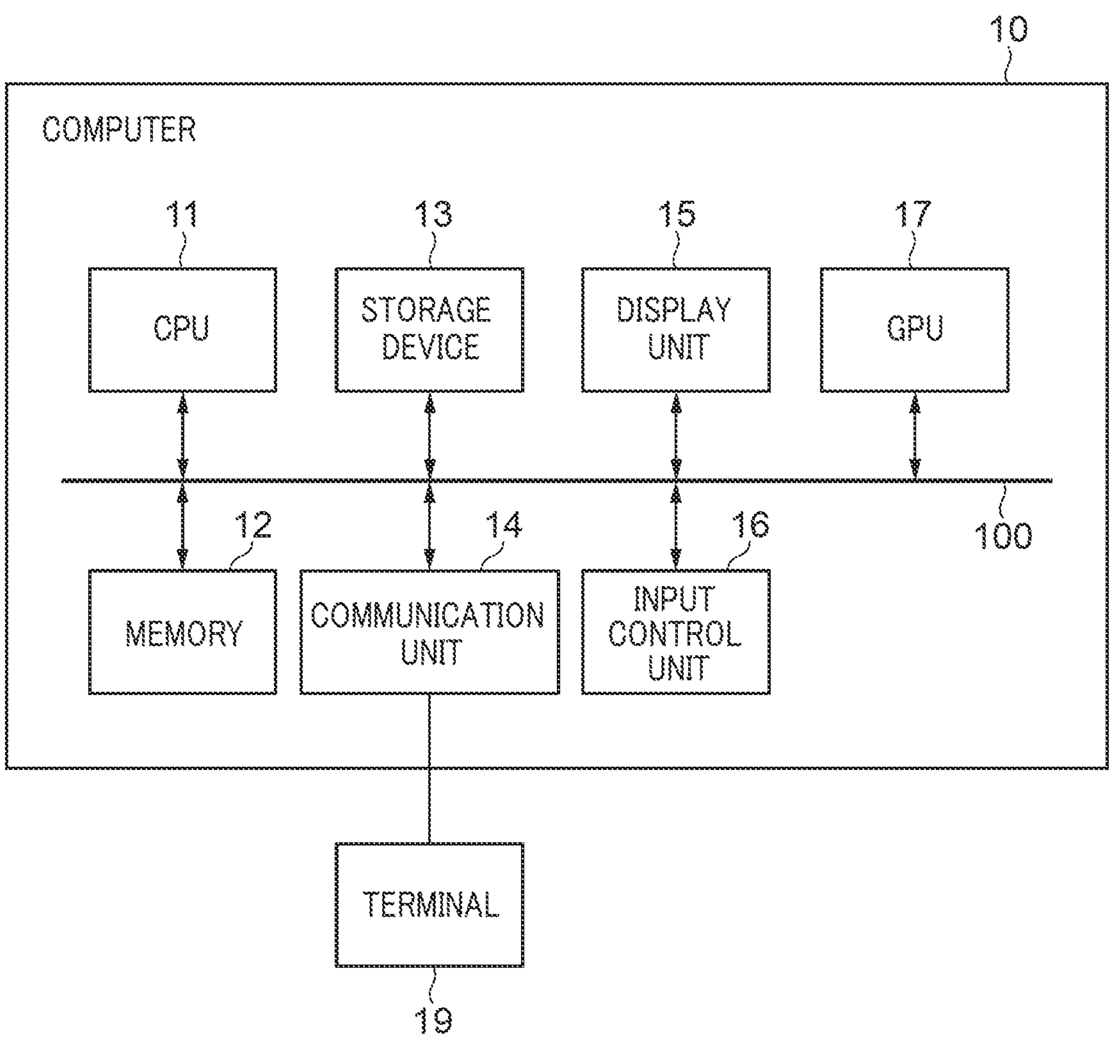
FIG. 1 is a diagram showing an example of a system according to embodiments of the present invention.

A first embodiment of the present invention will now be described with reference to the drawings. FIG. 1 is a diagram showing an example of a system according to the present embodiment. A computer 10 has a CPU 11, a memory 12, a storage device 13, a communication unit 14, a display unit 15, an input control unit 16, a GPU (Graphics Processing Unit) 17, and an internal bus 100. The computer 10 may have another arrangement. The computer 10 is a learning apparatus that performs machine learning. The computer 10 may be, for example, a cloud server or an edge computer. The computer 10 may have a function of performing image processing.

The CPU 11 controls operation of functional blocks of the computer 10 through the internal bus 100 by executing computer programs (hereafter referred to as programs) stored in the storage device 13. In the following description, it is assumed that the CPU 11 carries out processes in each of the embodiments, and the GPU 17 may assist operation of the CPU 11. The CPU 11 corresponds to an adjustment unit.

The memory 12 is a rewritable volatile memory. The memory 12 temporarily stores programs for controlling operation of the components of the computer 10, information on each operation of the computer 10, information before and after processing by the CPU 11, and so forth. The memory 12 which is, for example, RAM has a storage capacity large enough to temporarily store each piece of information. The memory 12 also stores programs that describes details of processing to be performed by a neural network (programs for performing machine learning). The memory 12 stores machine learned coefficient parameters such as a weight coefficient and a bias value in the neural network.

In the following description of each embodiment, it is assumed, for example, that the neural network (neural network system) is applied to a learning model. However, a support vector machine algorism, decision tree algorism, logistic regression algorism, or the like may be applied as a machine learning algorism for the learning model. The weight coefficient is a value that represents the strength of connection between nodes in the neural network, and the bias value is a value for offsetting an integrated value of the weight coefficient and input data.

The storage device 13 is an electrically erasable and programmable memory and is, for example, a hard disk or an SSD (Solid State Drive), The storage device 13 stores the computer programs mentioned above and information such as results of processing temporarily stored in the memory 12. The communication unit 14 carries out communications with external apparatuses and peripheral equipment via wireless communication or wired communication. In the example shown in FIG. 1, the communication unit 14 carries out communications with a terminal 19. The computer 10 is capable of carrying out communications with a plurality of terminals 19. Also, the communication unit 14 is capable of communicating information with peripheral equipment such as a storage medium. The communication unit 14 is capable of carrying out communications using, for example, a communication system conforming to a wireless communication standard such as IEEE802.11 or the USB (Universal Serial Bus) standard.

The display unit 15 is a display device such as a liquid crystal display or an organic EL display. The display unit 15 displays predetermined information which is output by the CPU 11, the GPU 17, and so forth. For example, the display unit 15 displays an image based on an image signal output from the GPU 17. The input control unit 16 controls inputs from input devices. For example, a keyboard and a mouse are used as the input devices. The input control unit 16 converts operations received by the input devices into electric signals and transmits the electric signals (input signals) to the components of the computer 10. The GPU 17 corresponds to a training unit.

The GPU 17 is a circuit which is capable of processing computations at high speed by concurrently performing computations. In each of the embodiments, the GPU 17 is used for computations in the neural network. The GPU 17 is capable of communicating with the components through the internal bus 100. The GPU 17 is suitably used for processing on image signals which are output to the display unit 15. In the following description it is assumed that in each of the embodiments, the GPU 17 is used for computations in the neural network. The computations in the neural network may be performed either by the CPU 11 or by the CPU 11 and the GPU 17 in cooperation with each other. The computations in the neural network may not be performed by the GPU 17 but may be performed either by a programming circuit, which is specialized for machine learning, or by the GPU 17 and the programming circuit, which is specialized for machine learning, in cooperation with each other.

The terminal 19 is an electronic apparatus which mainly carries out an inference process. The terminal 19 is, for example, a smartphone, a tablet terminal, or an image processing apparatus. The terminal 19 may also be an image pickup apparatus equipped with an image processing apparatus. The terminal 19 has the same arrangement as that of the computer 10. When the terminal 19 is the image pickup apparatus, the terminal 19 incorporates therein an image pickup unit including a lens, an image pickup device, and so forth. To carry out the inference process, the terminal 19 obtains a training model from the computer 10. In this case, a communication unit of the terminal 19 functions as an obtaining unit. A CPU of the terminal 19 causes a GPU to carry out the inference process and obtains an inference result. In this case, the GPU of the terminal 19 functions as an inference unit.

A description will now be given of learning by the neural network. The neural network in each of the embodiments may be, for example, a CNN (Convolutional Neural Network). The CNN has, for example, a network architecture in which fully connected layers and output layers are connected to layers composed of a series of alternate convolution layers and pooling layers. Machine learning in the neural network may be performed by an apparatus other than the computer 10. Machine learning of the neural network aims to optimize processing by making the coefficient parameters such as the weighting coefficient and the bias value in the neural network closer to appropriate values so as to achieve desired processing results.

A description will now be given of machine learning with the neural network which performs image restoration. The coefficient parameters are adjusted by training the neural network which performs the image restoration. With the neural network that has been trained, the inference process for the image restoration is carried out. The neural network may be applied to processing other than the image restoration. For example, the neural network may be applied to an inference process for predetermined image processing, voice processing, or the like.

The image restoration is, for example, a process in which an image (a decoded image) obtained by decoding an image compressed by encoding an image signal that has not been compressed (an image signal that has not yet been encoded) is restored. When an image signal that has not been compressed is referred to as an uncompressed image, a decoded image has distortion because of encoding, and its image quality is worse than that of the uncompressed image. Thus, the computer 10 performs the image restoration so as to restore the decoded image. Training data used in training the neural network includes a combination of an uncompressed image, which is a supervised image (supervised data), and a decoded image. The training data may be stored in, for example, the storage device 13 or may be obtained from an external apparatus (for example, an image pickup apparatus) by the communication unit 14.

A decoded image and a supervised image corresponding to the decoded image in the training data are input to the neural network. As a result, the GPU 17 carries out a computation process to adjust the coefficient parameters for the neural network. Multiple pieces of training data are input to the neural network, and the GPU 17 repeatedly carries out the computation process that adjusts the coefficient parameters for the neural network. The coefficient parameters for the neural network are adjusted such that the difference in pixel value between a restored image, which is output as a computation result by the neural network, and an uncompressed image, which is the supervised image, becomes small. For example, the mean squared error (MSE) is used for the computation process that adjusts the coefficient parameters in the neural network. However, methods other than the mean squared error may be used for adjustment of the coefficient parameters in the neural network.

The GPU 17 performs machine learning using the neural network so that MSE will be close to "0". For machine learning using the neural network, the back-propagation algorism using the mean squared error may be used for machine learning using the neural network. MSE is defined by an equation (1) below.

[Mathematical Equation 1]

$$MSR = \frac{1}{n}\sum_{i+1}^{n} x_i^2 \quad (1)$$

In the above equation (1), "x" represents an error of data, and "n" represents the number of pieces of data. Here, pixels of an image correspond to the data. By performing the computation making a pixel value of a decoded image with degraded image quality close to that of an uncompressed image whose image quality has not degraded, the image quality of the decoded image with worse image quality can be improved to implement image restoration. Machine learning performed in each of the embodiments is supervised learning, but, for example, reinforcement learning may also be used as a method for machine earning.

A description will now be given of the inference process. The inference process may be carried out either by either the computer 10 or by the terminal 19. It is assumed here that the inference process is carried out by the computer 10. As described above, when machine learning using the neural network is performed, the coefficient parameters in the neural network are adjusted. When an unknown decoded image is input to the neural network, the neural network carries out the inference process. Through the inference process carried out by the neural network, a restoration process for the decoded image is carried out, and a restored image is output. As described above, a plurality of pieces of training data is input to the neural network. A training data group comprised of the plurality of pieces of training data is a training set. It is assumed that the GPU 17 uses a feature value (image feature value) for the training set and performs machine learning using the neural network.

Figure 2A:
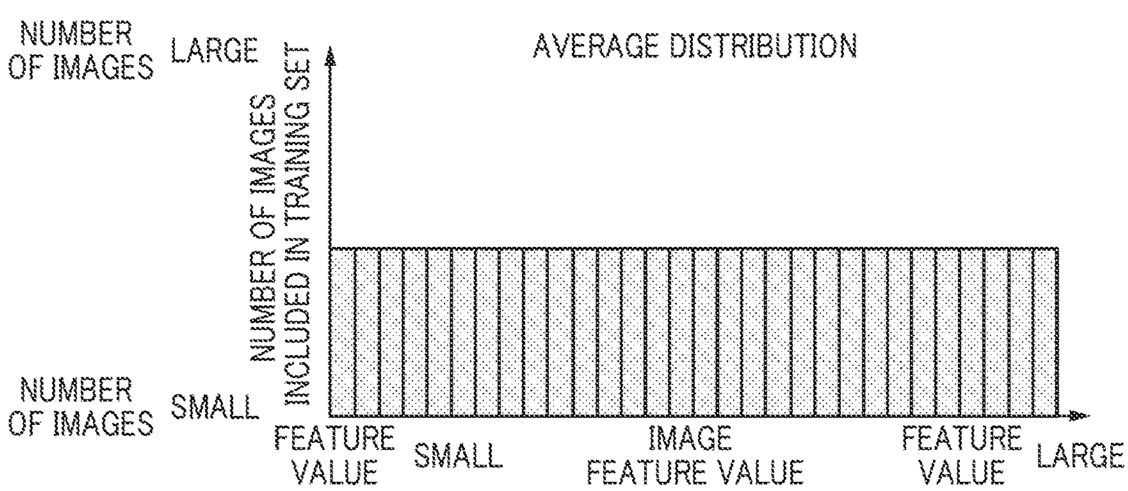
FIGS. 2A to 2C are views showing examples of distributions of image feature values.
Figure 2B:
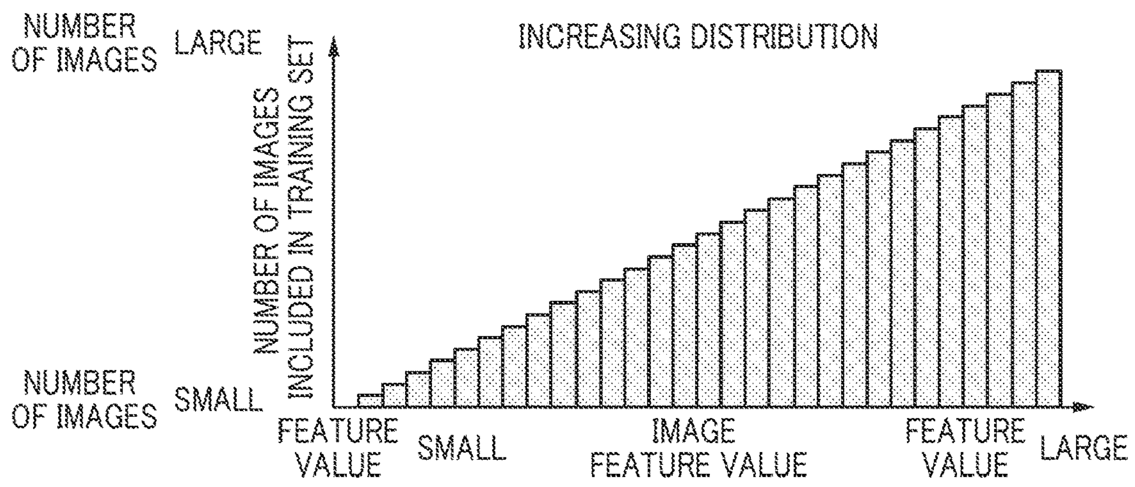
Figure 2C:
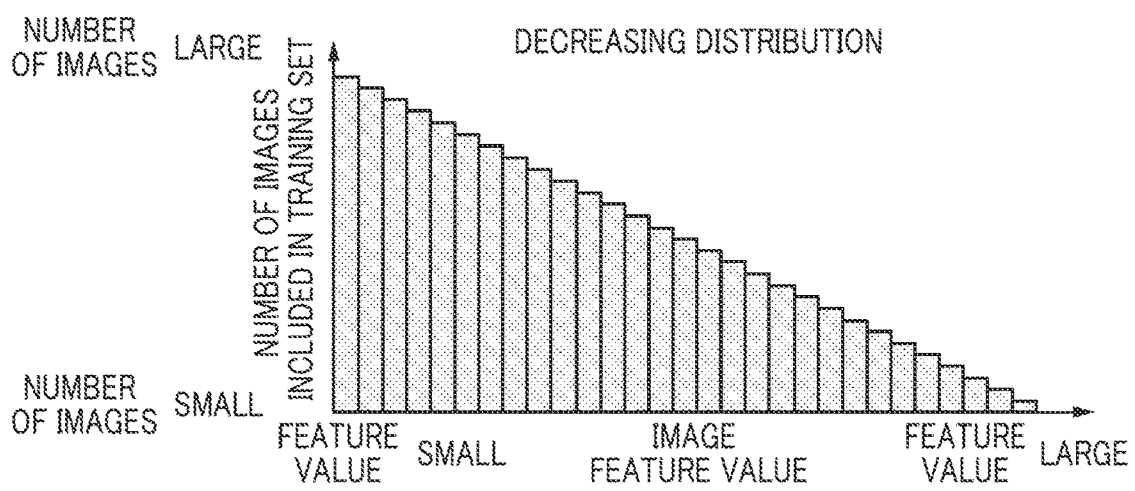

Here, it is assumed that a pixel difference value defined by a difference Pmax−Pmin between a pixel maximum value Pmax and a pixel minimum value Pmin of a decoded image is an image feature value. However, the calculation formula for the pixel difference value and the image feature value are not limited to them. The image feature value may be an average pixel value, a variance value, or the like. FIGS. 2A to 2C are views showing examples of distributions of image feature values. In FIGS. 2A to 2C, the horizontal axis represents image feature values, and the vertical axis represents the number of decoded images for training which are included in an image set. Each of the vertical axis and the horizontal axis indicates that the values increase as they go away from an intersection point of the vertical axis and the horizontal axis. Thus, FIGS. 2A to 2C show the number of images in each section of image feature values.

FIG. 2A is a view showing a distribution (average distribution) which averagely includes decoded images with small and large feature values. Namely, there are a uniform number of decoded images with small and large image feature values in the training set. FIG. 2B shows a distribution (increasing distribution) in which the number of decoded images increases with increasing image feature value. The increasing distribution corresponds to a first distribution. Namely, the increasing distribution is a distribution in which the ratio of decoded images with large image feature values in the image set increases as image feature values of decoded images increase. FIG. 2C shows a distribution (decreasing distribution) showing a trend opposite to that of the increasing distribution. The decreasing distribution corresponds to a second distribution. The decreasing distribution is a distribution in which the ratio of decoded images with small image feature values in the image set increases as image feature values of decoded images decreases.

As described above, the average distribution indicates that the number of decoded images included in each section of the image feature values is averagely distributed. In the uniform distribution, the number of decoded images does not have to be the same in all the sections of the image feature values. The increasing distribution indicates that the number of decoded images included in each section of the image feature values increases proportionally with the image feature values. In the increasing distribution, the image feature values and the number of decoded images do not have to be proportionate with each other. The decreasing distribution indicates that the number of decoded images included in each section of the image feature values decreases proportionally with the image feature values. In the decreasing distribution, the image feature values and the number of decoded images do not have to be proportionate with each other.

Figure 3:
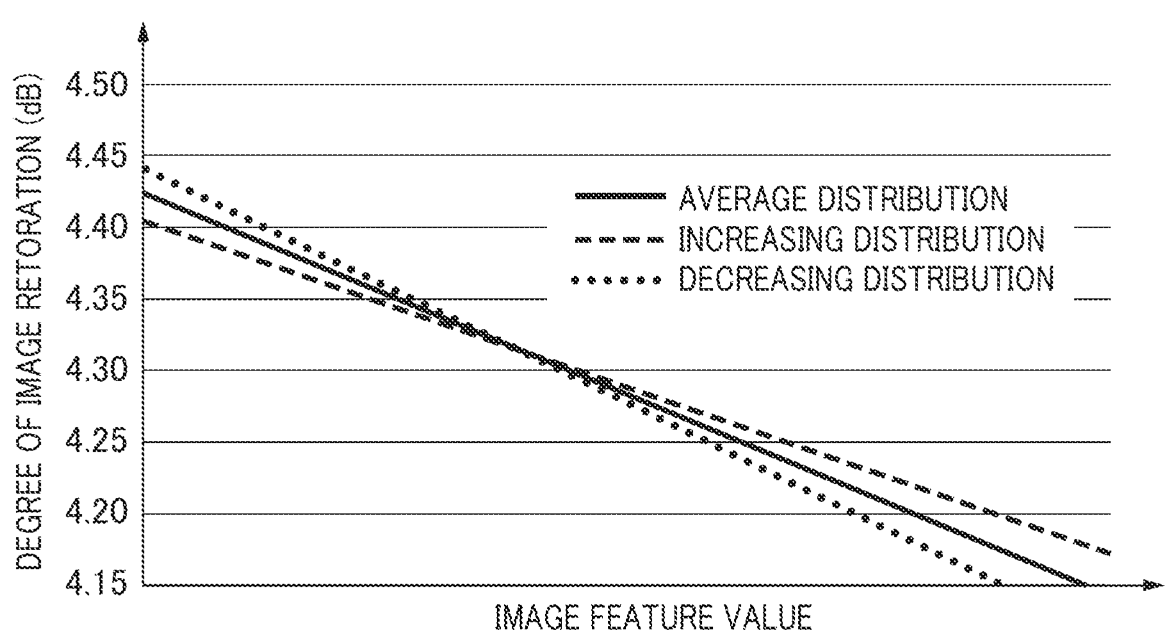
FIG. 3 is a view showing magnitudes of image quality restoration in three distributions.

A description will now be given of the inference process. As described above, the computer 10 carries out the inference process. However, an apparatus such as the terminal 19 other than the computer 10 may carry out the inference process. When a decoded image is input to the neural network, the GPU 17 carries out the inference process on the neural network and outputs an inference result as data. FIG. 3 is a graph showing the relationship between image feature values and degrees of image quality restoration. It is assumed that inference data, which is an image group for use in the inference process, has been adjusted to make the ratios of features in decoded images average. The CPU 11 obtains MSE for each of a pair of a restored image and an uncompressed image input to the neural network and a pair of a restored image and an uncompressed image output from the neural network. The CPU 11 then obtains peak signal-to-noise ratios (PSNRs) from the obtained MSEs.

The CPU 11 is able to obtain a degree of image quality restoration by obtaining a difference between the two PSNRs. The unit of PSNR is dB, and the greater the obtained difference value, the greater the degree of image quality restoration. PSNR is defined by an equation (2) below. In the equation (2), max represents a pixel maximum value which a decoded image could take. The section of image feature values represented by the horizontal axis in FIG. 3 is the same as that of image feature values in FIG. 2.

[Mathematical Equation 2]

$$PSNR = 20\log_{10}\frac{\max}{\sqrt{MSE}} \tag{2}$$

As shown by the inference result in FIG. 3, the greater the image feature value of a decoded image, the smaller the average value of image quality restoration. Thus, assuming that a pixel difference value is an image feature value, image quality restoration is more difficult for decoded images with larger image feature values, and image quality restoration is easier for decoded images with smaller image feature values. Moreover, as apparent from the trend in the graph of FIG. 3, in the increasing distribution indicated by a broken line, the image quality of decoded images whose image quality is difficult to be restored (decoded images with large feature values) is restored to the highest degree. On the other hand, in the increasing distribution, the image quality of decoded images whose image quality is easy to be restored (decoded images with small feature values) is restored to the lowest degree.

In the average distribution indicated by a solid line, with respect to decoded images with small feature values, the degree of image quality restoration is higher than in the increasing distribution and lower than in the decreasing distribution. On the other hand, in the average distribution, with respect to decoded images with large feature values, the degree of image quality restoration is lower than in the increasing distribution and higher than in the decreasing distribution. In the decreasing distribution indicated by a dotted line, the image quality of decoded images whose image quality is easy to be restored (decoded images with small feature values) is restored to the highest degree. On the other hand, in the decreasing distribution, the image quality of decoded images whose image quality is hard to be restored (decoded images with large feature values) is restored to the lowest degree.

Accordingly, in the first embodiment, the CPU 11 makes such an adjustment that the training set has the increasing distribution. This increases the number of times that decoded images whose image quality is difficult to be restored (decoded images with large feature values) are learned. As a result, occurrence of leaning to one side of the inference results by the neural network depending on the degree of difficulty of image quality restoration can be suppressed, and hence the degrees of image quality restoration are leveled out.

A description will now be given of a machine learning process, FIG. 4 is a diagram showing the machine learning process according to the first embodiment. Referring to FIG. 4, a plurality of decoded images is stored in a decoded image storage unit 21. The decoded image storage unit 21 may be, for example, the memory 12 or the storage device 13. An image feature value extraction unit 22 obtains a decoded image from the decoded image storage unit 21 and extracts an image feature value from the obtained decoded image. An image feature distribution adjustment unit 23 adjusts the distribution of image characteristics based on the extracted image feature value. As a result, a training set in which the distribution of image characteristics have been adjusted is generated. The generated training set is stored in a training set storage unit 24. The training set includes not only a plurality of decoded images but also uncompressed images (supervised images) corresponding to the respective decoded images. The image feature value extraction unit 22 and the image feature distribution adjustment unit 23 are implemented by the CPU 11.

An image restoration unit 25 is composed of a neural network. The GPU 17 performs machine learning with the neural network using the decoded images for training as inputs and using the uncompressed images as supervised images. The image restoration unit 25 outputs a restored image with restored image quality as a learning result. The output restored image is stored in a restored image storage unit 26. In performing machine learning using the neural network, the GPU 17 may update the training set at the time when it has finished machine learning using a predetermined number of decoded images stored in the training set storage unit 24. The predetermined number is set in advance before machine learning is performed.

When updating the training set, the image feature distribution adjustment unit 23 adjusts the image distribution. For example, the image feature distribution adjustment unit 23 updates the training set such that more decoded images with large feature values are included in the training set. The image feature distribution adjustment unit 23 should not always adjust the image distribution in this manner. For example, the image feature distribution adjustment unit 23 may update the training set such that the image feature values have the average distribution.

Figure 5:
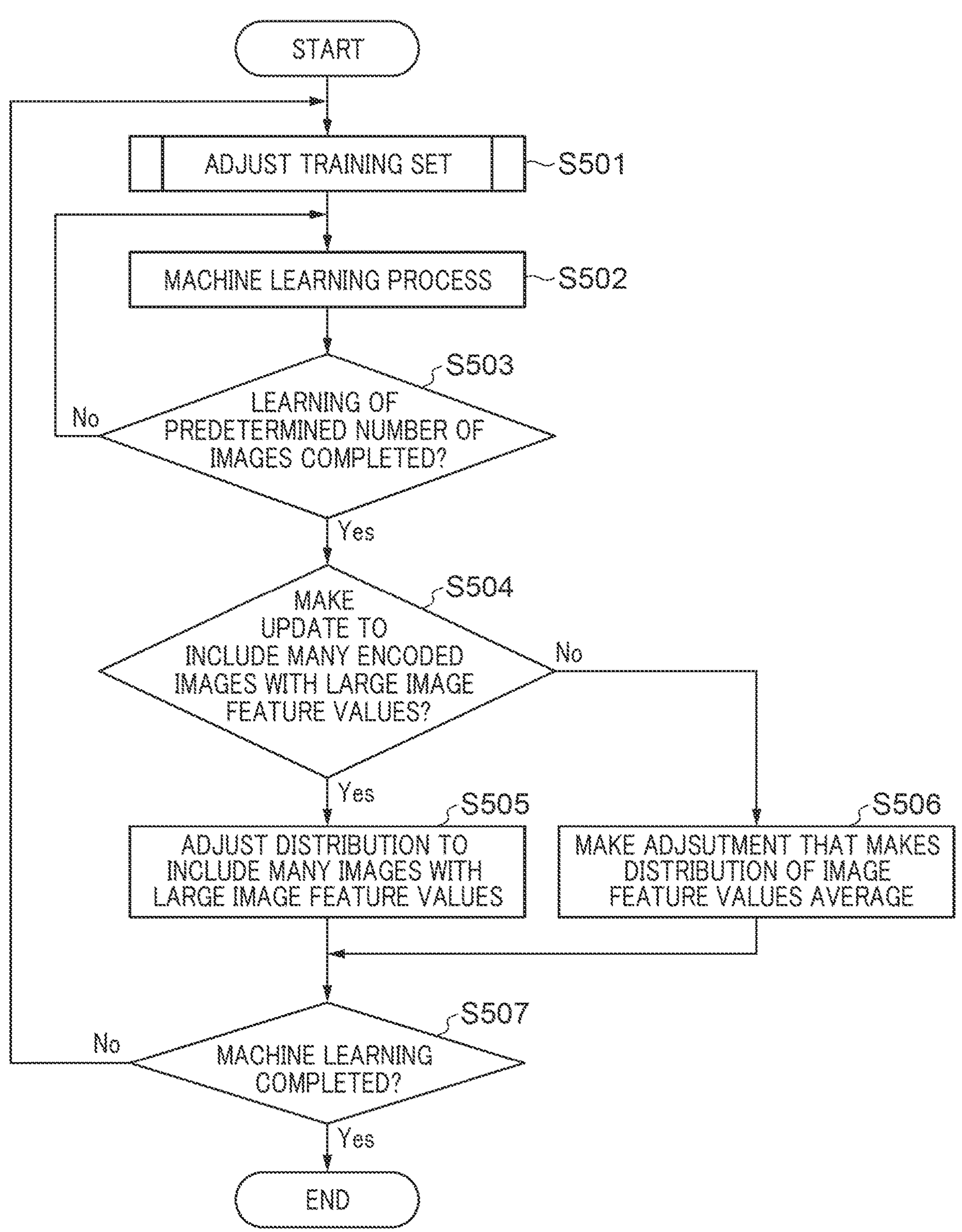
FIG. 5 is a flowchart showing the flow of a process according to the first embodiment.

A description will now be given of the flow of a process according to the first embodiment. FIG. 5 is a flowchart showing the flow of the process according to the first embodiment. In S501, the CPU 11 carries out an adjustment process using the image feature values in the training set as the process by the image feature value extraction unit 22 and the image feature distribution adjustment unit 23. The process in S501 will be described in detail later. After S501, the CPU 11 stores the training set in the memory 12, the storage device 13, or the like. In S502, the CPU 11 causes the GPU 17 to train the neural network. In S503, the CPU 11 determines whether machine learning of a predetermined number of decoded images in the training set (all decoded images included in the training set) has been completed. The CPU 11 may make the determination in S503 based on, for example, whether the number of times that learning is performed has reached a predetermined number. It should be noted that the determination process in S503 may be skipped. In this case, machine learning is performed without the training set being updated.

When the result of the determination is negative (No) in S503, the process returns to S502, in which the CPU 11 in turn continues the machine learning process using other decoded images. On the other hand, when the result of the determination is positive (Yes) in S503, the process proceeds to S504. Thus, after performing machine learning about all decoded images in the training set at least once, the CPU 11 carries out the process in S504 and the subsequent processes. In S504, the CPU 11 determines whether to update the training set such that more decoded images with large image feature values are included in the training set or update the training set such that the distribution of image feature values is average. It is assumed that which update to choose is set in advance. Alternatively, which update to choose may be determined according to the progress of machine learning. For example, when the degree of image restoration has not reached a desired one while machine learning is being performed, the CPU 11 may choose the update that will improve the degree of image quality restoration.

When the result of the determination in the S504 is positive (Yes), that is, when the CPU 11 determines that the training set is to be updated such that more decoded images with large image feature values are included in the training set, the process proceeds to S505. In S505, the CPU 11 adjusts the distribution such that more decoded images with large image feature values (decoded images with image feature values equal to or greater than a predetermined value) are included in the training set. At this time, the CPU 11 adjusts image distribution parameters according to mathematical expressions in advance. Decoded images with large image feature values are added to the training set. Then, the process then proceeds to S507.

When the result of the determination is negative (No) in S504, that is, when the training set is to be updated such that the distribution of image feature values is average, the process proceeds to S506. In S506, the CPU 11 makes an adjustment such that the distribution of image feature values is average. At this time, the CPU 11 adjusts image distribution parameters according to mathematical expressions determined in advance. Decoded images that will make the distribution of image feature values average are added to the training set. As a result, the distribution of image feature values of a plurality of decoded images included in the training set is made average.

In S507, the CPU 11 determines whether machine learning using the neural network has been completed. When the result of the determination is negative (No) in S507, that is, when machine learning has not been completed, the process returns to S501. On the other hand, when the result of the determination is positive (Yes) in S507, that is, when machine learning has been completed, the CPU 11 carries out the process in FIG. 5. When training of the neural network has been completed, a neural network for which coefficient parameters have been adjusted is generated as a learned model (trained model).

Figure 6:
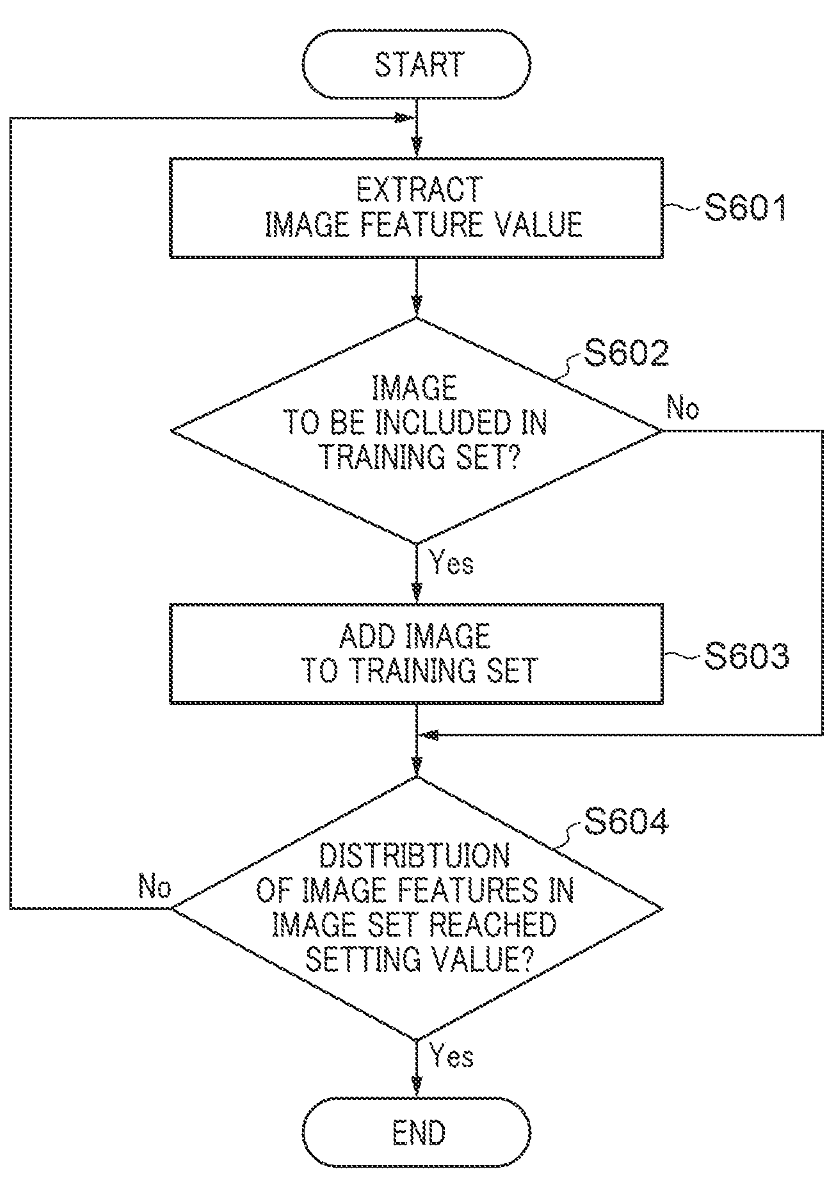
FIG. 6 is a flowchart showing the flow of a training set adjustment process.

A description will now be given of how the training set is adjusted in S501. FIG. 6 is a flowchart showing the flow of a training set adjustment process. In S601, the CPU 11 obtains a decoded image and extracts an image feature value from the obtained decoded image. As described above, an image feature value in each of the embodiments is a pixel difference value. The CPU 11 obtains a maximum pixel value Pmax and a minimum pixel value Pmin of the obtained decoded image and obtains a difference "Pmax−Pmin" as a pixel difference value. In S602, based on the image feature value extracted in S601, the CPU 11 determines whether the obtained decoded image is a decoded image to be included in the training set.

When the result of the determination is positive (Yes) in S602, that is, when the obtained decoded image is a decoded image to be included in the training set, the process proceeds to S603. On the other hand, when the result of the determination is negative (No) in S602, that is, when the obtained decoded image is not a decoded image to be included in the training set, the process proceeds to S604. The result of the determination may be positive (Yes) in S602 in a case where the decoded image having the extracted image feature value is a decoded image required for the training set to have a predetermined distribution (increasing distribution).

For example, it is assumed that the number of decoded images in the training set is 10,000, and the training set has a distribution (a predetermined distribution) in which decoded images included in a section in which the image feature value is the largest make up 20% of the total number of decoded images. In this case, when the number of decoded images included in the section in which the image feature value is the largest is 2,000 or more, there is no need to add decoded images to the training set. Thus, the result of the determination is negative (No) in S602, and the process in S603 is not carried out. On the other hand, when the number of decoded images included in the section in which the image feature value is the largest is less than 2,000, the CPU 11 carries out the process in S603 to add decoded images to the training set. As a result, the number of decoded images for training included in the training set is adjusted, so that decoded images for training included in the training set have the increasing distribution. It should be noted that the CPU 11 may add decoded images included in a section in which the image feature value is the smallest to the training set.

In S604, the CPU 11 determines whether the distribution of image feature values in the training set matches a distribution of image feature values in the training set which is set in advance (a predetermined distribution). At this time, the CPU 11 may make the determination in S604 based on whether the rate of distribution of image feature values in the training set has reached a predetermined setting value. When the result of the determination is negative (No) in S604, that is, when the distribution of image feature values in the training set does not match the distribution of image feature values in the training set which is set in advance, the process returns to S601. Then, the CPU 11 carries out the process in the flowchart of FIG. 6 using new decoded images until the distribution of image feature values in the training set matches the distribution of image feature values in the training set which is set in advance. On the other hand, when the result of the determination is positive (Yes) in S604, the CPU 11 ends the process in the flowchart of FIG. 6.

As described above, in the present embodiment, the CPU 11 makes the adjustment such that image feature values in the training set, which is for use in machine learning by the neural network, have the increasing distribution. Namely, the CPU 11 makes the adjustment such that more decoded images whose image quality is difficult to be restored are included in the training set. This increases the number of times that decoded images whose image quality is difficult to be restored are machine learned and prevents the degrees of difficulty of image quality restoration by the inference process, which is carried out by the trained neural network, from leaning to one side. As a result, the degrees of image quality restoration using the neural network can be leveled out, and as compared to the case where the training set is not adjusted, image quality restoration performance is improved. Therefore, according to the present embodiment, inference accuracy of a learned model obtained through machine learning is improved.

A description will now be given of a second embodiment. In the second embodiment, the distribution of image feature values in the training set is adjusted such that more decoded images with small feature values are included in the training set. Namely, machine learning is performed in which decoded images with small feature values are learned the number of times. Thus, the result of inference using a learned model generated in the second embodiment is suitable for image quality restoration of decoded images whose image quality is relatively easily restored (decoded images with small feature values). A description of the same features as those in the first embodiment is omitted here. An arrangement of the second embodiment is the same as that of the first embodiment.

Figure 7:
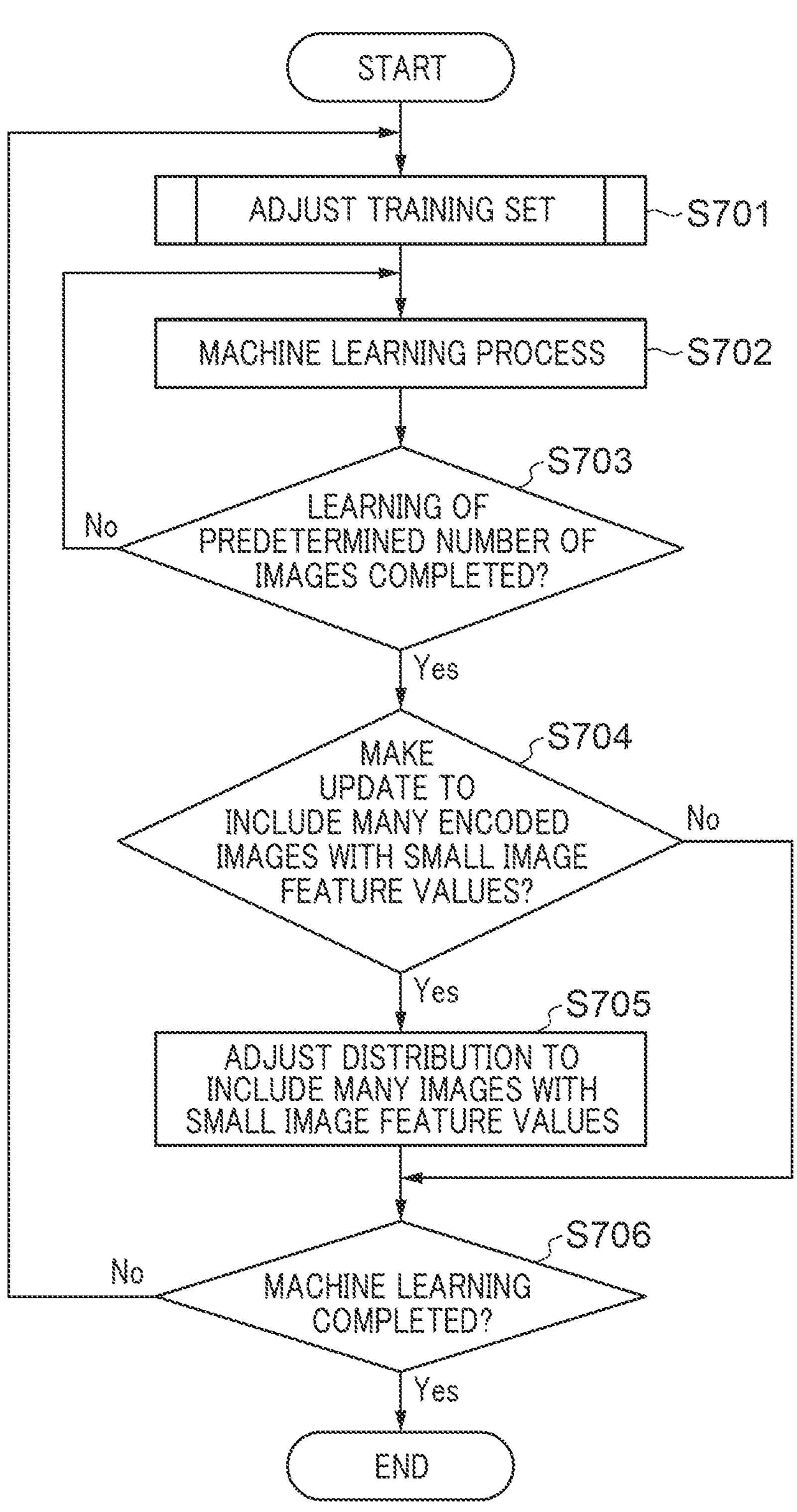
FIG. 7 is a flowchart showing the flow of a process according to a second embodiment.

FIG. 7 is a flowchart showing the flow of a process in the second embodiment. In S701, the CPU 11 adjusts the training set such that the distribution of image feature values with respect to a plurality of decoded images included in the training set is a predetermined distribution (the decreasing distribution). Accordingly, the CPU 11 determines whether an extracted decoded image is a decoded image required in order for the image feature values with respect to the plurality of decoded images included in the training set to have the decreasing distribution. When the extracted decoded image is a decoded image required in order for the image feature values with respect to the plurality of decoded images included in the training set to have the decreasing distribution, the CPU 11 adds the extracted decoded image to the training set. The flow of the process is the same as in the flowchart of FIG. 6. In the second embodiment, however, the CPU 11 adjusts the training set such that the image feature values with respect to the plurality of decoded images included in the training set have the decreasing distribution.

In the flowchart of FIG. 7, S703-S702 and S703 are the same as S502 and S503 in FIG. 5, and hence description thereof is omitted here. In S704, the CPU 101 determines whether to make an update such that more decoded images with small image feature values (decoded images with image feature values equal to or smaller than a predetermined value) are included in the training set. It is assumed that which update to choose is set in advance. Alternatively, which update to choose may be determined according to the progress of machine learning. In the second embodiment, in a case where the training set is updated after machine learning on all decoded images in the training set is performed at least once, the CPU 11 makes the update such that more decoded images with small image feature values are included in the training set.

When the result of the determination is positive (Yes) in S704, that is, when the update is to be made such that more decoded images with small image feature values are included in the training set, the process proceeds to S705. On the other hand, when the result of the determination is negative (No) in S704, that is, when the update is not to be made such that more decoded images with small image feature values are included in the training set, the process proceeds to S707. In S705, the CPU 101 adjusts the distribution such that more decoded images with small image feature values are included in the training set. At this time, the CPU 11 adjusts image distribution parameters according to mathematical equations determined in advance. Decoded images with small image feature values are added to the training set. The process then proceeds to S706.

In S706, the same process is carried out as in S507 in FIG. 5. Namely, in S706, the CPU 101 determines whether machine learning has been completed. When the result of the determination is negative (No) in S706, the process returns to S701. On the other hand, when the result of the determination is positive (Yes) in S706, the CPU 11 ends the process in the flowchart of FIG. 7.

In the second embodiment, the CPU 11 adjusts the training set with consideration given to characteristics of data to be learned. Namely, the CPU 11 performs control such that the neural network performs machine learning enabling image quality restoration suitable for decoded images with small image feature value, that is, decoded images having a characteristic of being flat. As a result, in the second embodiment, image quality restoration performance for flat images is improved.

A description will now be given of a third embodiment. Description of features corresponding to those of the first and second embodiments is omitted. An arrangement of the third embodiment is the same as those in the first and second embodiments. In the second embodiment, machine learning is performed using a training set that has been adjusted so as to include many decoded images with small feature values. In this case, machine learning is performed with one neural network using many decoded images with small feature values, and hence image quality restoration performance for decoded images whose image feature values are not small (for example, decoded images with large image feature values) is low. Therefore, in the third embodiment, machine learning is performed using a plurality of neural networks to generate a plurality of learned models.

Figure 8:
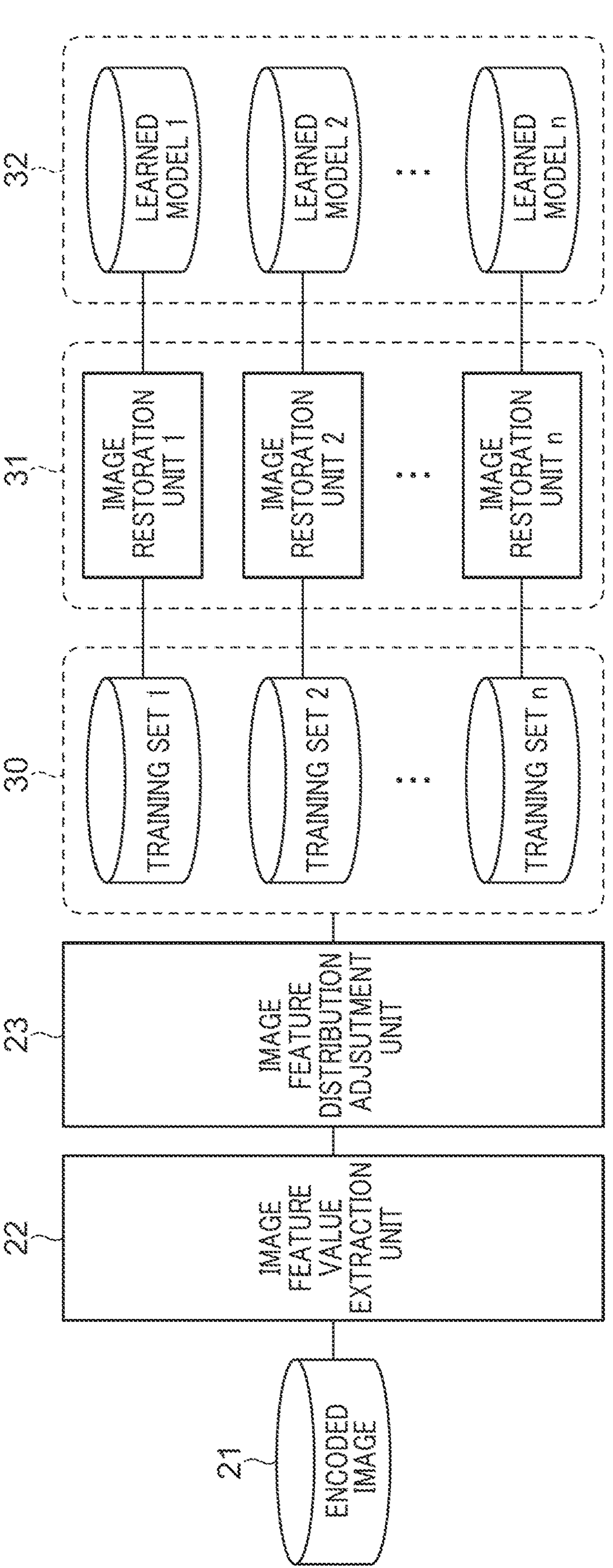
FIG. 8 is a diagram showing a machine learning process according to a third embodiment.

FIG. 8 is a diagram showing a machine learning process according to the third embodiment. The CPU 11, which acts as the image feature extraction unit 22, extracts an image feature value from a decoded image. The CPU 11, which is the image feature distribution adjustment unit 23, adjusts the distribution of image characteristics based on the extracted image feature value. At this time, the CPU 11 generates a plurality of training sets with different distributions of image feature values. In the example shown in FIG. 8, a training set group 30 is comprised of “n” (“n” is an integer equal to or greater than two) training sets. In the third embodiment, a plurality of image restoration units constitutes an image restoration unit group 31. Each image restoration unit in the image restoration unit group 31 corresponds to the image restoration unit 25 in FIG. 4. Namely, the image restoration units in the image restoration unit group 31 are implemented by the respective GPUs 17. In the example shown in FIG. 8, the “n” image restoration units corresponding in number to the number of training sets constitute the image restoration unit group 31. Each of the image restoration units inputs a decoded image in the corresponding training set to the neural network to perform machine learning.

The image restoration units in the image restoration unit group 31 outputs respective learned models as leaning results. In the example shown in FIG. 8, n learned models are generated as learning results. The “n” learned models constitute a learned model group 32. Each of the learned models is a trained neural network, and coefficient parameters for it has been adjusted. The learned are obtained by machine learning using the training sets with different distributions of image feature values.

Figures 9A, 9B, 9C, 9D:
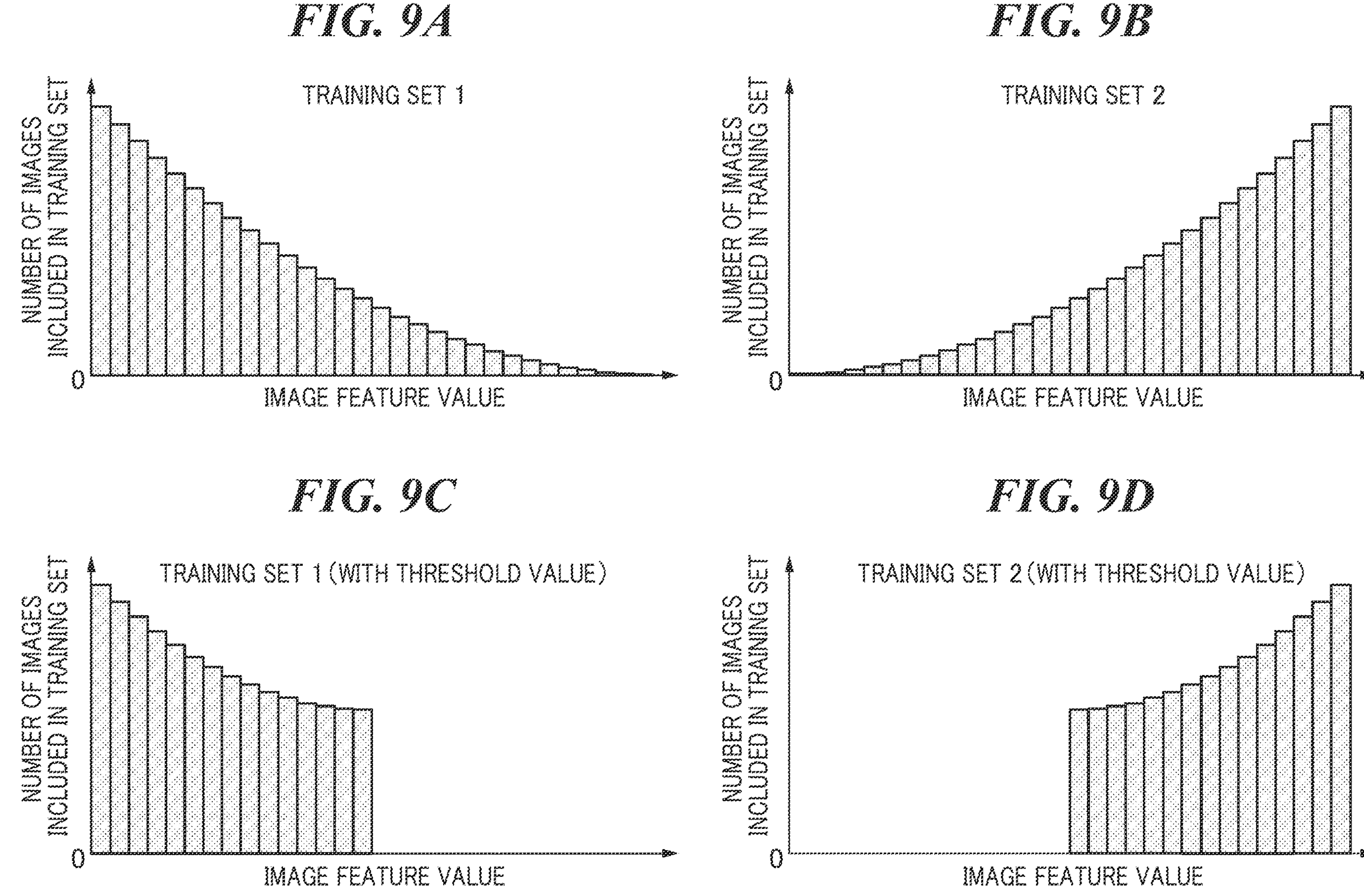
FIGS. 9A to 9D are views showing examples of training sets.

FIGS. 9A to 9D are views showing examples of training sets. FIG. 9A is a view showing an example of a training set 1 that includes many decoded images with small image feature values. FIG. 9B is a view showing an example of a training set 2 that includes many decoded images with large image feature values. The training set 1 and the training set 2 are some of the training sets in the training set group 30. In a case where machine learning is performed using the training set 1, the same process as in the first embodiment is carried out. In a case where machine learning is performed using the training set 2, the same process as in the second embodiment is carried out.

The training sets in the training set group 30 may be each comprised of a plurality of decoded images with image feature values smaller than a predetermined threshold value as shown in FIG. 9C. Also, the training sets in the training set group 30 may be each comprised of a plurality of decoded images with image feature values equal to or greater than the predetermined threshold value as shown in FIG. 9D. For example, in the example shown in FIG. 9C, decoded images with large image feature values (decoded images with image feature values equal to or greater than the predetermined threshold value) in the decreasing distribution are not used for machine learning. Also, in the example shown in FIG. 9D, decoded images with small image feature values (decoded images with image feature values smaller than the predetermined threshold value) in the increasing distribution are not used for machine learning. The threshold value can be set to an arbitrary value.

Figure 10:
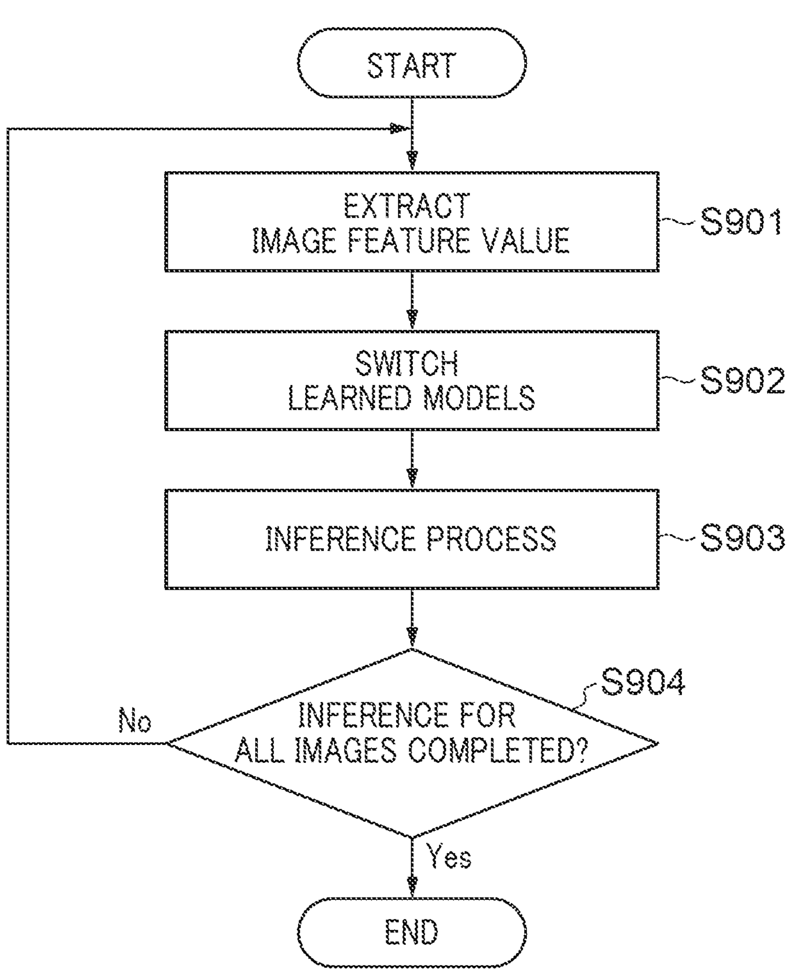
FIG. 10 is a flowchart showing the flow of an interference process according to the third embodiment.

As a result of the process described above, a plurality of learned models are generated by machine learning using a plurality of learning sets with different distributions of image feature values. A description will now be given of an inference process according to the third embodiment. FIG. 10 is a flowchart showing the flow of the inference process according to the third embodiment. In the following description, it is assumed that the computer 10 carries out the inference process, but the terminal 19 may carry out the inference process. In this case, the terminal 19 obtains a plurality of learned models from the computer 10.

In S901, the CPU 11 expands an arbitrary decoded image from an inference set, which is stored in the storage device 13, on the memory 12 and extracts an image feature value from the expanded decoded image. The inference set is a decoded image group comprised of a plurality of unknown decoded images for use in carrying out the inference process. In S902, the CPU 11 extracts an image feature value of a decoded image that is subjected to inference, and according to the extracted image feature value, changes learned models to be used for the inference process. For example, when the extracted image feature value is small, the CPU 11 selects a learned model obtained by machine learning using a training set including many decoded images with small image feature values. When the extracted image feature value is large, the CPU 11 selects a learned model obtained by machine learning using a training set including many decoded images with large image feature values.

In S903, the CPU 11 inputs the decoded image to the selected learned model and causes the GPU 17 to carry out the inference process. The GPU 17 in turn performs a computation using the neural network for which coefficient parameters have been adjusted. A restored image is then obtained as a computation result. The decoded image input to the neural network is distorted due to a compression process in encoding, and the neural network outputs the restored image whose distortion has been corrected. In S904, the CPU 11 determines whether the inference process for all decoded images included in the inference set has been completed. When the result of the determination is negative (No) in S904, that is, the inference process for all decoded images included in the inference set has not been completed, the process returns to S901. On the other hand, when the result of the determination is positive (Yes) in S904, that is, the inference process for all decoded images included in the inference set has been completed, the CPU 11 ends the process in the flowchart of FIG. 10.

As described above, in the third embodiment, a plurality of learned models are generated through machine learning with neural networks, which are performed using a plurality of training sets which have been adjusted so as to have different distributions of image feature values, respectively. The inference process is then carried out using a learned model suitable for an image feature value of a decoded image targeted for inference, and hence image quality restoration performance is improved.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD) IM), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-029497, filed on Feb. 25, 2020 which is hereby incorporated by reference herein in its entirety.

What is claimed is:

1. A learning apparatus comprising:

(i) at least one memory configured to store computer-executable instructions and at least one processor configured to execute the computer-executable instructions stored in the at least one memory, (ii) at least one circuit, or both (i) and (ii) that implement:

an adjustment unit configured to, for a training set including a plurality of pieces of training data, adjust the number of pieces of training data included in the training set such that feature values of the plurality of pieces of training data have a predetermined distribution; and a training unit configured to perform machine learning using the training set to generate a learned model, wherein the training data is a decoded image for training, which is obtained by encoding and decoding an uncompressed image, the learned model outputs, when the decoded image is input to the learned model, a restored image obtained by restoring the decoded image, the feature value is a pixel difference value of the decoded image, the adjustment unit adjusts the number of pieces of training data included in the training set by obtaining a decoded image and extracting the pixel difference value from the decoded image, wherein the pixel difference value is a difference between a maximum pixel value and a minimum pixel value of the obtained decoded image, wherein the adjustment unit classifies the obtained decoded image into one of a plurality of sections of pixel difference values based on the extracted pixel difference value, wherein the adjustment unit determines whether a current number of decoded images included in the training set in the one section is less than a target number corresponding to the one section in the predetermined distribution, wherein the adjustment unit adds the obtained decoded image to the training set in response to determining that the current number is less than the target number, wherein the training unit performs the machine learning using all decoded images included as training data in the training set, wherein, after the training unit has performed the machine learning using all decoded images included as training data in the training set, the adjustment unit updates the training set by obtaining another decoded image, extracting another pixel difference value from the another decoded image, and adding the another decoded image to the training set based on the another pixel difference value so that the feature values of decoded images included in the training set have the predetermined distribution, and wherein the training unit further performs the machine learning using the updated training set.

2. The learning apparatus according to claim 1, wherein the adjustment unit adjusts the number of pieces of training data such that the feature values have a first distribution in which a ratio of the training data increases as the feature value of the training data increases.

3. The learning apparatus according to claim 2, wherein the adjustment unit adds, after the machine learning is performed using the plurality of pieces of training data included in the training set, training data with feature values equal to or greater than a predetermined value.

4. The learning apparatus according to claim 2, wherein the adjustment unit makes an adjustment that makes the distribution of the feature values of the plurality of pieces of training data average, after the machine learning is performed using all of the training data included in the training set.

5. The learning apparatus according to claim 1, wherein the adjustment unit adjusts, for each of a plurality of training sets, a number of pieces of training data included in the training set such that feature values of the plurality of pieces of training data have a predetermined distribution; and each of a plurality of training units performs machine learning using a corresponding training set.

6. The learning apparatus according to claim 5, wherein an inference process is carried out by switching the plurality of learned models that are obtained through machine learning performed by the respective training units.

7. The learning apparatus according to claim 6, wherein the inference process is carried out by switching to any of the plurality of learned models according to a feature value of data that is subject to inference.

8. The learning apparatus according to claim 5, wherein the training set includes a plurality of pieces of training data having the feature values smaller than a predetermined threshold value or a plurality of pieces of training data having the feature values equal to or greater than the predetermined threshold value.

9. The learning apparatus according to claim 1, wherein the predetermined distribution is an increasing distribution in which a target number of decoded images increases as the pixel difference value increases.

10. An electronic apparatus comprising:

(i) at least one memory configured to store computer-executable instructions and at least one processor configured to execute the computer-executable instructions stored in the at least one memory, (ii) at least one circuit, or both (i) and (ii) that implement an inference unit configured to carry out an inference process using a learned model, wherein the learned model is generated by machine learning using a training set including a plurality of pieces of training data, in which the number of pieces of training data has been adjusted such that feature values of the plurality of pieces of training data have a predetermined distribution, the training data is a decoded image for training, which is obtained by encoding and decoding an uncompressed image, the learned model outputs, when the decoded image is input to the learned model, a restored image obtained by restoring the decoded image, the feature value is a pixel difference value of the decoded image, the number of pieces of training data included in the training set are adjusted by obtaining a decoded image and extracting the pixel difference value wherein the pixel difference value is a difference between a maximum pixel value and a minimum pixel value of the obtained decoded image, wherein the obtained decoded image is classified into one of a plurality of sections of pixel difference values based on the extracted pixel difference value, wherein whether a current number of decoded images included in the training set in the one section is less than a target number corresponding to the one section in the predetermined distribution is determined, wherein the obtained decoded image is added to the training set in response to it being determined that the current number is less than the target number, wherein the machine learning is performed using all decoded images included as training data in the training set, wherein, after the machine learning is performed using all decoded images included as training data in the training set, the training set is updated by obtaining another decoded image, extracting another pixel difference value from the another decoded image, and adding the another decoded image to the training set based on the another pixel difference value so that the feature values of decoded images included in the training set have the predetermined distribution, and wherein the machine learning is further performed using the updated training set.

11. A learning method comprising:

adjusting, for a training set including a plurality of pieces of training data, the number of pieces of training data included in the training set such that feature values of the plurality of pieces of training data have a predetermined distribution; and performing machine learning using the training set to generate a learned model, wherein the training data is a decoded image for training, which is obtained by encoding and decoding an uncompressed image, and the learned model outputs, when the decoded image is input to the learned model, a restored image obtained by restoring the decoded image, the feature value is a pixel difference value of the decoded image, the adjusting adjusts the number of pieces of training data included in the training set by obtaining a decoded image and extracting the pixel difference value from the decoded image, wherein the pixel difference value is a difference between a maximum pixel value and a minimum pixel value of the obtained decoded image, wherein the obtained decoded image is classified into one of a plurality of sections of pixel difference values based on the extracted pixel difference value, wherein whether a current number of decoded images included in the training set in the one section is less than a target number corresponding to the one section in the predetermined distribution is determined, wherein the obtained decoded image is added to the training set in response to it being determined that the current number is less than the target number, wherein the machine learning is performed using all decoded images included as training data in the training set, wherein, after the machine learning is performed using all decoded images included as training data in the training set, the training set is updated by obtaining another decoded image, extracting another pixel difference value from the another decoded image, and adding the another decoded image to the training set based on the another pixel difference value so that the feature values of decoded images included in the training set have the predetermined distribution, and wherein the machine learning is further performed using the updated training set.

12. A control method for an electronic apparatus, comprising:

obtaining a learned model from a learning apparatus that, for a training set including a plurality of pieces of training data, adjusts the number of pieces of training data included in the training set such that feature values of the plurality of pieces of training data have a predetermined distribution, performs machine learning using the training set in which the number of pieces of training data has been adjusted, and generates the learned model; and carrying out an inference process using the obtained learned model, wherein the training data is a decoded image for training, which is obtained by encoding and decoding an uncompressed image, the obtained learned model outputs, when the decoded image is input to the obtained learned model, a restored image obtained by restoring the decoded image, the feature value is a pixel difference value of the decoded image, the learning apparatus adjusts the number of pieces of training data included in the training set by obtaining a decoded image and extracting the pixel difference value from the decoded image, wherein the pixel difference value is a difference between a maximum pixel value and a minimum pixel value of the obtained decoded image, wherein the obtained decoded image is classified into one of a plurality of sections of pixel difference values based on the extracted pixel difference value, wherein whether a current number of decoded images included in the training set in the one section is less than a target number corresponding to the one section in the predetermined distribution is determined, wherein the obtained decoded image is added to the training set in response to it being determined that the current number is less than the target number, wherein the machine learning is performed using all decoded images included as training data in the training set, wherein, after the machine learning is performed using all decoded images included as training data in the training set, the training set is updated by obtaining another decoded image, extracting another pixel difference value from the another decoded image, and adding the another decoded image to the training set based on the another pixel difference value so that the feature values of decoded images included in the training set have the predetermined distribution, and wherein the machine learning is further performed using the updated training set.

13. A non-transitory computer-readable storage medium storing a computer-executable program that executes a learning method, the learning method comprising:

adjusting, for a training set including a plurality of pieces of training data, the number of pieces of training data included in the training set such that feature values of the plurality of pieces of training data have a predetermined distribution; and performing machine learning using the training set to generate a learned model, wherein the training data is a decoded image for training, which is obtained by encoding and decoding an uncompressed image, and the learned model outputs, when the decoded image is input to the learned model, a restored image obtained by restoring the decoded image, the feature value is a pixel difference value, a pixel mean value, or a pixel variance value of the decoded image, the adjusting adjusts the number of pieces of training data included in the training set by obtaining a decoded image and extracting the pixel difference value from the decoded image, wherein the pixel difference value is a difference between a maximum pixel value and a minimum pixel value of the obtained decoded image, wherein the obtained decoded image is classified into one of a plurality of sections of pixel difference values based on the extracted pixel difference value, wherein whether a current number of decoded images included in the training set in the one section is less than a target number corresponding to the one section in the predetermined distribution is determined, wherein the obtained decoded image is added to the training set in response to it being determined that the current number is less than the target number, wherein the machine learning is performed using all decoded images included as training data in the training set, wherein, after the machine learning is performed using all decoded images included as training data in the training set, the training set is updated by obtaining another decoded image, extracting another pixel difference value from the another decoded image, and adding the another decoded image to the training set based on the another pixel difference value so that the feature values of decoded images included in the training set have the predetermined distribution, and wherein the machine learning is further performed using the updated training set.

14. A non-transitory computer-readable storage medium storing a computer-executable program that executes a control method for an electronic apparatus, the control method comprising:

obtaining a learned model from a learning apparatus that, for a training set including a plurality of pieces of training data, adjusts the number of pieces of training data included in the training set such that feature values of the plurality of pieces of training data have a predetermined distribution, performs machine learning using the training set in which the number of pieces of training data has been adjusted, and generates the learned model; and carrying out an inference process using the obtained learned model, wherein the training data is a decoded image for training, which is obtained by encoding and decoding an uncompressed image, the obtained learned model outputs, when the decoded image is input to the obtained learned model, a restored image obtained by restoring the decoded image, the feature value is a pixel difference value of the decoded image, the learning apparatus adjusts the number of pieces of training data included in the training set by obtaining a decoded image and extracting the pixel difference value from the decoded image, wherein the pixel difference value is a difference between a maximum pixel value and a minimum pixel value of the obtained decoded image, wherein the obtained decoded image is classified into one of a plurality of sections of pixel difference values based on the extracted pixel difference value, wherein whether a current number of decoded images included in the training set in the one section is less than a target number corresponding to the one section in the predetermined distribution is determined, wherein the obtained decoded image is added to the training set in response to it being determined that the current number is less than the target number, wherein the machine learning is performed using all decoded images included as training data in the training set, wherein, after the machine learning is performed using all decoded images included as training data in the training set, the training set is updated by obtaining another decoded image, extracting another pixel difference value from the another decoded image, and adding the another decoded image to the training set based on the another pixel difference value so that the feature values of decoded images included in the training set have the predetermined distribution, and wherein the machine learning is further performed using the updated training set.

* * * * *